(12) United States Patent
Zhou et al.

(10) Patent No.: US 10,445,231 B2
(45) Date of Patent: Oct. 15, 2019

(54) METHOD AND SYSTEM FOR STORAGE DEVICE METADATA MANAGEMENT AND PROCESSING

(71) Applicant: Shannon Systems Ltd., Shanghai (CN)

(72) Inventors: Zhen Zhou, Shanghai (CN); Xueshi Yang, Cupertino, CA (US)

(73) Assignee: SHANNON SYSTEMS LTD., Shanghai (CN)

( * ) Notice: Subject to any disclaimer, the term of this patent is extended or adjusted under 35 U.S.C. 154(b) by 172 days.

(21) Appl. No.: 15/528,839

(22) PCT Filed: Dec. 4, 2015

(86) PCT No.: PCT/CN2015/096496
§ 371 (c)(1),
(2) Date: May 23, 2017

(87) PCT Pub. No.: WO2016/086899
PCT Pub. Date: Jun. 9, 2016

(65) Prior Publication Data
US 2017/0344474 A1 Nov. 30, 2017

(30) Foreign Application Priority Data

Dec. 5, 2014 (CN) .......................... 2014 1 0737270

(51) Int. Cl.
*G06F 12/00* (2006.01)
*G06F 12/06* (2006.01)
*G06F 11/00* (2006.01)

(52) U.S. Cl.
CPC .......... *G06F 12/0607* (2013.01); *G06F 11/00* (2013.01); *G06F 12/06* (2013.01); *G06F 12/0646* (2013.01)

(58) Field of Classification Search
None
See application file for complete search history.

(56) References Cited

U.S. PATENT DOCUMENTS 8,185,688 B2   5/2012   Wan
8,407,449 B1*  3/2013   Colon ................ G06F 12/0246
                                                711/103

(Continued)

FOREIGN PATENT DOCUMENTS

CN    1936867 A    3/2007
CN   102819496 A   12/2012

(Continued)

OTHER PUBLICATIONS

International Search Report dated May 9, 2017, issued in application No. PCT/CN2015/096496.

*Primary Examiner* — Jason W Blust
(74) *Attorney, Agent, or Firm* — McClure, Qualey & Rodack, LLP

(57) ABSTRACT

A method and system provide for storage device metadata management. The storage device metadata management method comprises: a superblock is formed of at least one erase block; the superblock reserves a space for storing metadata related to the superblock; the metadata related to the superblock comprises a serial number distributed to the superblock and address mapping information in the superblock; the address mapping information stores a mapping relationship of a physical block address to a logic block address (S1); when data is written into the superblock, the address mapping information corresponding to the data is also written into the superblock (S2); when a system is recovered, a page table of the storage system is recovered according to the address mapping information of the superblock; the page table marks a mapping relationship of a logic block address to a physical block address (S3). The above technical solution can ensure a complete recovery of the page table during startup, as well as ensure a normal operation of the storage device when started.

28 Claims, 2 Drawing Sheets

(56) References Cited

U.S. PATENT DOCUMENTS

| | | | | |
|---|---|---|---|---|
| 2008/0082736 A1* | 4/2008 | Chow | ............... | G06F 12/0246 |
| | | | | 711/103 |
| 2009/0216832 A1 | 8/2009 | Quinn et al. | | |
| 2011/0072199 A1* | 3/2011 | Reiter | ................ | G06F 13/14 |
| | | | | 711/103 |
| 2014/0082261 A1* | 3/2014 | Cohen | ................ | G11C 16/06 |
| | | | | 711/103 |
| 2014/0089630 A1 | 3/2014 | Pignatelli | | |
| 2014/0156966 A1* | 6/2014 | Ellis | ................ | G06F 3/064 |
| | | | | 711/173 |

FOREIGN PATENT DOCUMENTS

| | | |
|---|---|---|
| CN | 102866956 A | 1/2013 |
| CN | 103176916 A | 6/2013 |
| CN | 103744795 A | 4/2014 |
| CN | 104461391 A | 3/2015 |

* cited by examiner

METHOD AND SYSTEM FOR STORAGE DEVICE METADATA MANAGEMENT AND PROCESSING

FIELD OF THE INVENTION

The application relates to computer storage technology, and in particular to a storage device metadata management method and system.

DESCRIPTION OF THE RELATED ART

Flash (NAND Flash)-based data storage technology has developed rapidly over the past ten years, gradually replacing the traditional magnetic hard drive (hard disk drive, HDD) in many applications. The most obvious difference between flash and the traditional hard disk drive is that a quite complex flash translation layer (FTL) is needed. Due to the characteristics of flash memory, it does not support overwriting operations, the Logical Block Address (LBA) to Physical Block Address (PBA) is dynamically changed, and the FTL needs to maintain the mapping table data structure for this dynamic change. The dynamic mapping table forms a part of metadata to achieve a conversion of the LBA to the PBA of the flash memory. In the data storage system, in addition to user data that needs to be stored, a certain amount of metadata is also essential. Solid State Drives (SSD) have brought a revolutionary improvement in the performance of data storage systems, and they have also brought new challenges for the storage and recovery of metadata. Because events such as system restarts and power outages are unavoidable, metadata needs to exist not only in volatile DRAMs, but also in a non-volatile storage medium, so that the FTL can access and update at any time, and the integrity of the data must be ensured to be 100%, otherwise it will cause a serious loss of user data, even to the point where the entire SSD is no longer available.

The metadata that needs to be maintained includes the following sections: 1. The basic format of the SSD, including the use of the flash memory types, number, and organizational structure. 2. The blocks which are bad blocks, namely the blocks that cannot be used. 3. How the logic block address (LBA) is mapped to the physical block address (PBA). 4. If the same LBA corresponds to a plurality of PBAs, which one corresponds to the latest version. 5. The number of erases of each block. 6. Other information that needs to be maintained, such as various statistics. If the metadata needs to be saved on the flash media, there are other aspects that need to be considered: 1. Where to save it. Each erase block may be a bad one, and may also become bad, so how can the metadata be found at the next startup? 2. When to write. The metadata is constantly changing, and flash memory cannot be rewritten in the original location. Currently, the SSD used in the industry mainly operates two ways: one is to use another reliable media to store metadata; the other is to write the entire metadata only when the power is turned off or shut down. But both have serious problems, because there is no real reliable medium that meets the requirements for the size of the metadata and the required write performance. At the same time, due to the existence of system crashes, sudden shut downs, and other possibilities, the reliability of the overall writing is low.

Thus, how to improve the reliability of storage and recovery of metadata on the flash media has become a problem that needs to be solves by a person skilled in the art.

BRIEF SUMMARY OF INVENTION

In view of the above disadvantages of the prior art, an object of the present invention is to provide a storage device metadata management method and system for solving the low reliability of storage and recovery of metadata on the flash media of the prior art.

To achieve the above objects and other related objects, the present invention provides a storage device metadata management method, wherein the storage device metadata management method includes: a superblock having at least one erase block; the superblock reserves a space for storing metadata related to the superblock; the metadata related to the superblock includes a serial number distributed by the superblock and address mapping information of the superblock; the address mapping information saves the mapping relationship of a physical block address to a logic block address; when data is written into the superblock, the address mapping information corresponding to the data is also written into the superblock; when the system is recovered, a page table of the storage system is recovered according to the address mapping information of the superblock; the page table marks the mapping relationship of a logic block address to a physical block address.

Alternatively, when the system is recovered, the page table is recovered according to a reversal of the address mapping information of each superblock.

Alternatively, the space for storing the metadata related to the superblock is adjacent to a data storage space of the superblock.

Alternatively, the data related to the superblock further includes the number of erases of the superblock and/or at least one statistical data of the superblock.

Alternatively, when the same logic block address exists in the address mapping information of different superblocks, the physical block address corresponding to the logic block address in the page table is the physical block address corresponding to the address mapping information of the superblock whose serial number is assigned in the back part.

Alternatively, when the same logic block address exists in the address mapping information of different superblocks, the physical block address corresponding to the logic block address in the page table is the physical block address corresponding to the address mapping information of the superblock which is written later.

Alternatively, the storage device metadata management method further includes: when the system is recovered, for the superblock which is not completely written, a complete scan is performed on the superblock which is not completely written for reading the mapping relationship of a logic address and a physical address, and recovering the page table which is not completely written.

Alternatively, static data and/or bad block information in the metadata is stored in a starting erase block of the storage device.

The present invention provides a storage device metadata management system, wherein the storage device metadata management system includes: a superblock management module, configured to form a superblock from at least one erase block; the superblock reserves a space for storing metadata related to the superblock; the metadata related to the superblock includes a serial number distributed to the superblock and address mapping information in the superblock; the address mapping information stores the mapping relationship of a physical block address to a logic block address; when data is written into the superblock, the address mapping information corresponding to the data is also written into the superblock; a system recover module, configured to recover a page table of a storage system according to the address mapping information of the superblock when a system is recovered; the page table marks the mapping relationship of a logic block address to a physical block address.

Alternatively, when the system is recovered, the address mapping information in each superblock is reversed for recovering the mapping relationship of a logic sector to a physical sector of the storage system.

Alternatively, a space for storing the metadata related to the superblock is adjacent to a data storage space of the superblock.

Alternatively, the metadata related to the superblock further comprises erase times of the superblock and/or at least one statistical data of the superblock.

Alternatively, when the system is recovered, while the same logic block address exists in the address mapping information of different superblocks, the physical block address corresponding to the logic block address in the page table is the physical block address corresponding to the address mapping information of the superblock whose serial number is assigned in the back part.

Alternatively, when the system is recovered, while the same logic block address exists in the address mapping information of the same superblock, the physical block address corresponding to the logic block address in the page table is the physical block address corresponding to the address mapping information of the superblock which is written later.

Alternatively, the system recovery module further performs a complete scan of the superblock which is not completely written for reading the mapping relationship of a logic address and a physical address and recovers the page table which is not completely written for the superblock which is not completely written.

The present invention further provides a storage device, wherein the storage device includes the storage device metadata management system described above.

Alternatively, the storage device is a flash-based solid-state disk.

As described above, the storage device metadata management method and system of the present invention have the following beneficial effects: giving consideration to the fault tolerance, performance cost, implementation complexity, and many other aspects, ensuring that the page table will be fully recovered while starting up, and ensuring that the SSD can work properly after booting.

The present invention can satisfy the following requirements: 1. It is not affected by the bad blocks which are dynamically generated. 2. It is not affected by a sudden power failure or system crash. 3. Even though some data cannot be recovered due to the occurrence of extreme fault conditions, the effects are limited. 4. The startup time should be as short as possible. 5. The shutdown time should be as short as possible. 6. The effects on the performance of normal operation should be as small as possible. 7. The demand for space should be as small as possible. Furthermore, the following properties can be achieved while using the technical proposal of the present invention: 1. The shutdown time is less than 10 ms, at most two pages are required for each flash memory chip. 2. When starting up, at most one one-thousandth of the total capacity of the data should be read. 3. One one-thousandth of the total flash memory capacity is occupied. 4. Basically, performance is not affected under normal operation.

BRIEF DESCRIPTION OF COMPONENT LABEL 1 storage device metadata management system
11 superblock management module
12 system recover module
S1-S3 step

DETAILED DESCRIPTION OF INVENTION

Further areas to which the present system and method for sharing the information of the product materials can be applied will become apparent from the detailed description provided herein. It should be understood that the detailed description and specific examples, while indicating exemplary embodiments of a system and a method for sharing the information of the product materials, are intended for the purposes of illustration only and are not intended to limit the scope of the invention.

The embodiments of the present invention will be described by specific examples. Other advantages and effects of the present invention can be easily understood by those skilled in the art from the disclosure of the specification. The present invention may also be implemented or practiced by other different specific embodiments, and the details in the specification can also be modified or changed based on different viewpoints and applications without departing from the spirit of the present invention.

It should be noted that the figures provided in the embodiment only schematically describe the basic conception of the present invention, and the figures only show the components related to the present invention rather than drawing the number, shape and size of the components according to practical implementation. The type, quantity and proportion of various components can be changed optionally in actual implementation, and its component layout type can also be more complicated.

Figure 1:
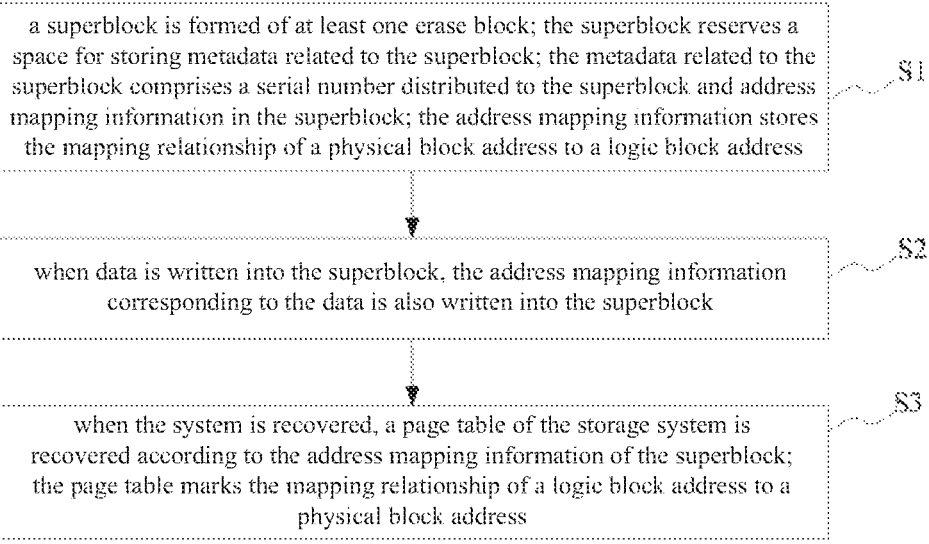
FIG. 1 illustrates a flow chart of an embodiment of the storage device metadata management method of the present invention.

The present invention provides a storage device metadata management method. In an embodiment, as shown in FIG. 1, the storage device metadata management method includes:

In step S1, a superblock is formed of at least one erase block. The superblock reserves a space for storing metadata related to the superblock. The metadata related to the superblock comprises a serial number distributed to the superblock and address mapping information in the superblock. The address mapping information stores the mapping relationship of a physical block address to a logic block address. Specifically, the metadata of the storage device includes: the basic format of the storage device, such as SSD, including the use of the flash memory types, number, and organizational structure, unless this part of the data is reformatted, or it will not be changed, and it can also be referred to as static data; bad block information, which blocks are bad blocks, i.e. the blocks that are not available, the number of bad blocks may increase with the passage of time, but the increase speed is very slow; how the logic sector address, also referred to as the logic block address (LBA), is mapped to the physical sector address, also referred to as the physical block address (PBA); if the same LBA corresponds to a plurality of PBAs, which one corresponds to the latest version; the number of erases of each block; other information that needs to be maintained, such as various statistics. The space for storing the metadata related to the superblock is adjacent to a data storage space of the superblock. Thus we can refer the space for storing the metadata related to the superblock as Epilog. In an embodiment, the static data in the metadata and/or the bad block information are stored in the initial erase block of the storage device. The bad block information can be a bad block table. In an embodiment, the metadata related to the superblock further includes the number of erases of the superblock and/or at least one statistical data of the superblock.

In step S2, when the data is written to the superblock, the address mapping information corresponding to the data is also written to the superblock. Specifically, when the data is written into one of the superblocks, the address mapping information corresponding to the written data is also written into the superblock immediately after writing the data. The system accesses the data through the page table, the page table marks the mapping relationship of the logic block address to the physical block address, but the written address mapping information data is the reverse of the data in the page table, i.e. the data of the address mapping information marks the mapping relationship of the physical block address to the logic block address. By using the present method, the partial metadata information (including the entire page table information) is distributed in each superblock. In an embodiment, when the data is written into some of the superblock, a variety of statistical information is also written into the space of the superblock that stores the metadata related to the superblock.

In step S3, when the system is recovered, the address mapping information in each superblock is reversed to recover the page table of the storage system; the page table marks the mapping relationship of the logic block address to the physical block address. Because the small page table in each superblock only includes the mapping in the superblock, and the mapping is reversed, i.e. PBA→LBA, thus we need to reverse it to obtain the mapping of LBA→PBA. This is an O(n) algorithm. The mapping of PBA to LBA may be many-to-one, which means that the same LBA may correspond to many PBAs, and only one of them is the final version. The cost is relatively high if a distribution and a record serial number are written for each PBA. In an embodiment, a method is used to distribute a serial number for each superblock, and record it in an Epilog. We can easily know the sequence of any two PBAs according to this field: First, when the same logic block address exists in the address mapping information of different superblocks, the physical block address corresponding to the logic block address in the page table is the physical block address corresponding to the address mapping information of the superblock whose serial number is distributed to the back part. That is, in the different superblocks, the data of new blocks is new, and the data of old blocks is old. Second, when the same logic block address exists in the address mapping information of different superblocks, the physical block address corresponding to the logic block address in the page table is the physical block address corresponding to the address mapping information of the superblock which is written later. That is, in the same superblock, the PBA which is written earlier is old, and the PBA which is written later is new.

In an embodiment, the storage device metadata management method further includes: when a system is recovered, for the superblock which is not completely written, a complete scan is made of the superblock which is not completely written for reading the mapping relationship of the logic address and the physical address, and recovering the page table which is not completely written. When the SSD turns off, it may have one or more superblocks which does not include a complete Epilog, we call this superblock unsealed. For the superblock which is not completely written, its Epilog is unavailable, we have to scan this superblock from the beginning. When each PBA is written, the LBA included in each PBA is also written in the data, thus we can still obtain the mapping of PBA→LBA. Because the number of unsealed superblocks is strictly limited, this does not affect the time complexity of the algorithm. The storage device metadata management method can be applied to the SSD, and it can also be applied to traditional hard disk-based arrays, or arrays of next-generation storage media.

Figure 2:
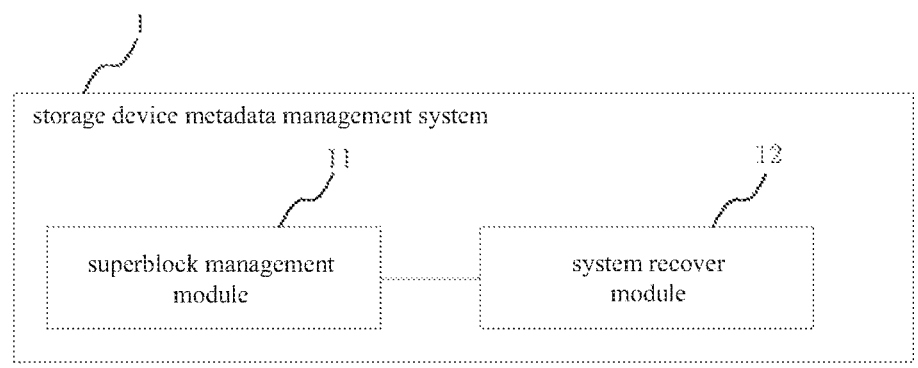
FIG. 2 illustrates a module diagram of an embodiment of the storage device metadata management system of the present invention.

The present invention provides a storage device metadata management system. In an embodiment, as shown in FIG. 2, the storage device metadata management system 1 includes a superblock management module 11 and system recover module 12. Wherein:

The superblock management module 11 is configured to form a superblock from at least one erase block; the superblock reserves a space for storing metadata related to the superblock; the metadata related to the superblock includes a serial number distributed to the superblock and address mapping information in the superblock; the address mapping information stores the mapping relationship of a physical block address to a logic block address; when data is written into the superblock, the address mapping information corresponding to the data is also written into the superblock. Specifically, the metadata of the storage device includes: the basic format of the storage device, such as SSD, including the use of the flash memory type, number, and organizational structure, unless this part of the data is reformatted, or it will not be changed, and it can also be referred to as static data; the bad block information, which blocks are bad blocks, i.e. the blocks that are not available, the number of bad blocks may increase with the passage of time, but the increase speed is very slow; how the logic sector address, also referred to as the logic block address (LBA), is mapped to the physical sector address, also referred to as the physical block address (PBA); if the same LBA corresponds to a plurality of PBAs, which one corresponds to the latest version; the number of erases of each block; other information that needs to be maintained, such as various statistics. The space for storing the metadata related to the superblock is adjacent to a data storage space of the superblock. Thus we can refer the space for storing the metadata related to the superblock as Epilog. In an embodiment, the static data in the metadata and/or the bad block information are stored in the initial erase block of the storage device. The bad block information can be a bad block table. In an embodiment, when the data is written in to one of the superblocks, the superblock management module 11 writes the address mapping information corresponding to the written data into the superblock immediately after writing the data. The system accesses the data through the page table, the page table marks the mapping relationship of the logic block address to the physical block address, but the written address mapping information data is the reverse of the data in the page table, i.e. the data of the address mapping information marks the mapping relationship of the physical block address to the logic block address. By using the present system, the partial metadata information (including the entire page table information) is distributed in each superblock. In an embodiment, when the data is written into some of the superblock, a variety of statistical information is also written into the space of the superblock that stores the metadata related to the superblock. In an embodiment, the metadata related to the superblocks of the superblock management module 11 further includes the number of erases of the superblock and/or various statistical data of the superblock. When the data is written into one of the superblock, the superblock management module 11 further writes at least one statistical data into the space of the superblock storing the metadata related to the superblock.

The system recover module 12 is configured to reverse the address mapping information in each superblock for recovering the page table of the storage system when the system is recovered; the page table marks the mapping relationship of a logic block address to a physical block address; when the same logic block address exists in the address mapping information of different superblocks, the physical block address corresponding to the logic block address is the physical block address corresponding to the address mapping information of the superblock whose serial number is assigned in the back part. Specifically, because the small page table in each superblock only includes the mapping in the superblock, and the mapping is reversed, i.e. PBA→LBA, we need to reverse it to obtain the mapping of LBA→PBA. This is still an O(n) algorithm. In an embodiment, the mapping of PBA to LBA may be many-to-one, which means the same LBA may correspond to many PBAs, and only one of them is the final version. The cost is relatively high if a distribution and a record serial number are written for each PBA. A method of the system recover module 12 is to distribute a serial number for each superblock, and record it in an Epilog. The system recover module 12 can easily know the sequence of any two PBAs according to this field: First, when the same logic block address exists in the address mapping information of different superblocks, the physical block address corresponding to the logic block address in the page table is the physical block address corresponding to the address mapping information of the superblock whose serial number is distributed to the back part. That is, in the different superblocks, the data of new blocks is new, and the data of old blocks is old. Second, when the same logic block address exists in the address mapping information of different superblocks, the physical block address corresponding to the logic block address in the page table is the physical block address corresponding to the address mapping information of the superblock which is written later. That is, in the same superblock, the PBA which is written earlier is old, and the PBA which is written later is new. In an embodiment, the system recover module 12 further includes: when the system is recovering, a complete scan is performed on the superblock which is not completely written for reading the mapping relationship of a logic address and a physical address and recovers the page table which is not completely written for the superblock which is not completely written. The storage device metadata management system can be applied to the SSD, and it can also be applied to traditional hard disk-based arrays, or arrays of next-generation storage media.

Figure 3:
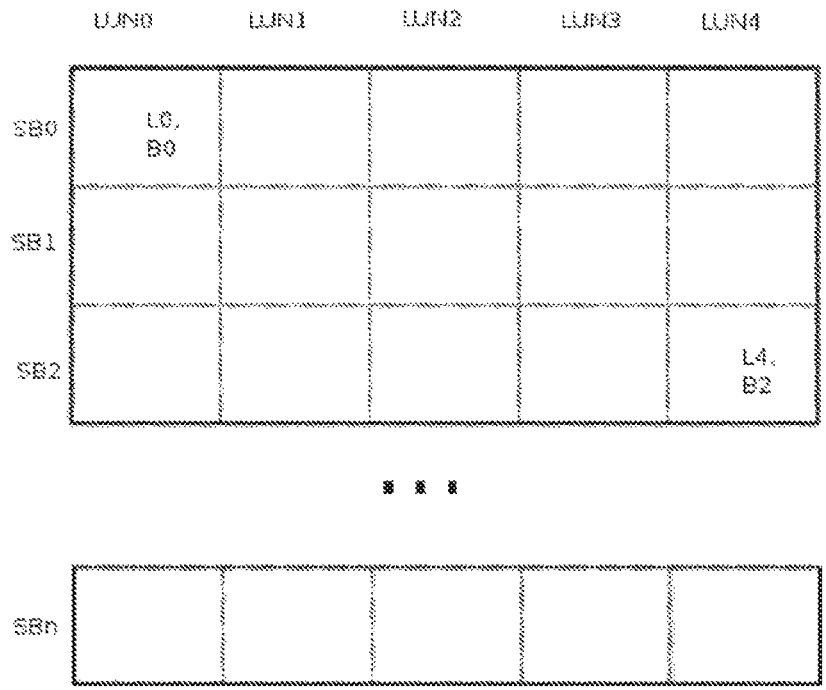
FIG. 3 illustrates a schematic structure of an embodiment of a storage device of the present invention.
Figure 4:
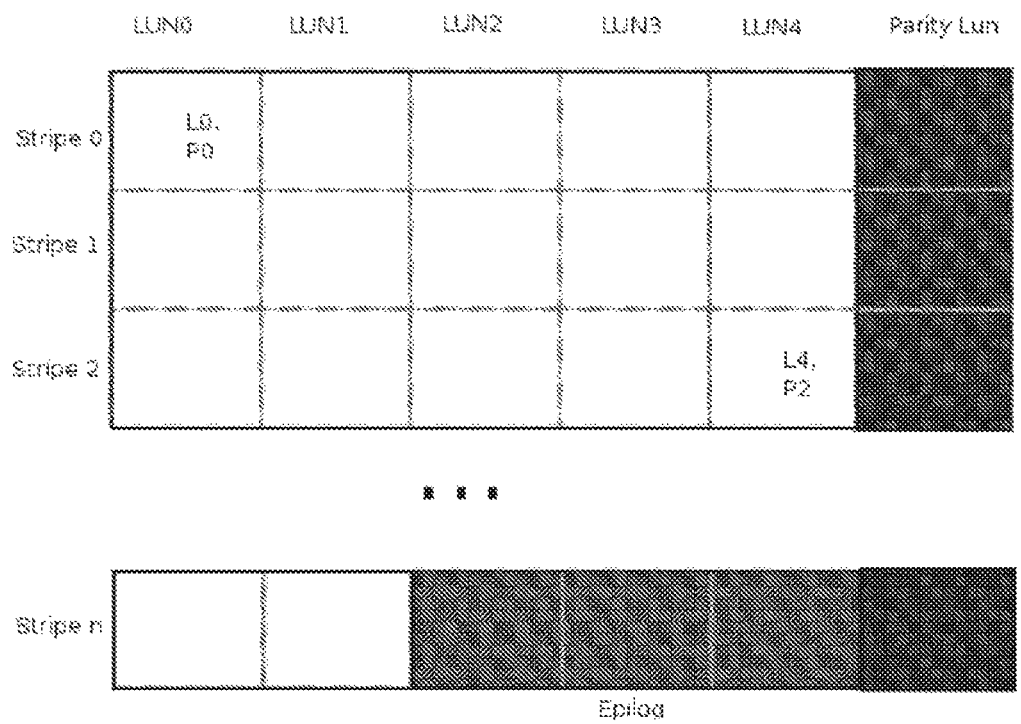
FIG. 4 illustrates a schematic structure of an embodiment of a storage device of the present invention.

A storage device, including the storage device metadata management system 1. In an embodiment, the static data in the metadata is written into the first few erase blocks by the storage device only at the time of formatting, which may be referred to as a Master Boot Record (MBR). For the bad block information, we write the bad block into the remaining space of the MBR when the bad block appears. The erase block after the first few erase blocks of at least one flash memory chip forms a superblock, as shown in FIG. 3, where the LUN (Logic Unit Number) is a single operated Flash memory cell, the SB (Superblock) is a superblock. The organizational structure within each superblock is shown in FIG. 4, in the embodiment, one superblock is formed of six erase blocks from six LUNs, wherein one of the LUNs is used to store a parity code of the superblock. In this superblock, the same page from each LUN forms an odd-even stripe. In FIG. 4, Epilog is the space for storing the metadata related to the superblock. In an embodiment, the storage device includes the SSD (Solid State Drive).

As described above, the present invention provides a storage device metadata management method and system, including the following beneficial effects: giving consideration to the fault tolerance, performance cost, implementation complexity, and many other aspects, ensuring that the page table will be fully recovered while starting up, and ensuring that the SSD can work properly after booting. The present invention can satisfy the following requirements: 1. It is not affected by the bad blocks which are dynamically generated. 2. It is not affected by sudden power failure or a system crash. 3. Even though some data cannot be recovered due to the occurrence of extreme fault conditions, the effects are limited. 4. The startup time should be as short as possible. 5. The shutdown time should be as short as possible. 6. The effects on the performance of normal operation should be as small as possible. 7. The demand for space should be as small as possible. Furthermore, the following properties can be achieved while using the technical proposal of the present invention: 1. The shutdown time is very short, at most two pages are required for each flash memory chip. 2. When starting up, at most one one-thousandth of the total capacity of the data should be read. 3. The storing of the metadata occupies one one-thousandth of the total flash memory capacity. 4. Basically, the performance is not affected under normal operation. Therefore, the present invention effectively overcomes the disadvantages of the prior art and has a high value in industrial applicability.

The embodiments as described above are exemplary only and illustrate the principles and the efficacy of the present invention, but they are not intended to limit the present invention. It will be apparent to those skilled in the art that various modifications and variations can be made in the embodiments as described above without departing from the spirit and scope of the present invention. Therefore, all equivalent modifications and variations without departing from the spirit and scope of the present invention achieved by those skilled in the art are still included in the claims of the present invention.

What is claimed is:

1. A storage device metadata management method, wherein the storage device metadata management method comprises:

a superblock is formed of at least one erase block; the superblock reserves a space for storing metadata related to the superblock; the metadata related to the superblock comprises a serial number distributed to the superblock and address mapping information in the superblock; the address mapping information stores a mapping relationship of a physical block address to a logic block address;

when data is written into the superblock, the address mapping information corresponding to the data is also written into the superblock;

when a system is recovered, a page table of a storage system is recovered according to the address mapping information of the superblock; the page table marks a mapping relationship of a logic block address to a physical block address;

wherein static data in the metadata is written into a starting erase block by the storage device at a time of formatting, and bad block information in the metadata is written into a remaining space of the starting erase block when a bad block appears;

wherein the static data comprises a basic format of the storage device and the basic format comprises a use of flash memory types, number, and organizational structure.

2. The storage device metadata management method as claimed in claim 1, wherein when the system is recovered, the address mapping information in each superblock is reversed for recovering the mapping relationship of a logic sector to a physical sector of the storage system.

3. The storage device metadata management method as claimed in claim 1, wherein the space for storing the metadata related to the superblock is adjacent to a data storage space of the superblock.

4. The storage device metadata management method as claimed in claim 1, wherein the metadata related to the superblock further comprises number of erases of the superblock and/or at least one statistical data of the superblock.

5. The storage device metadata management method as claimed in claim 1, wherein when the same logic block address exists in the address mapping information of different superblocks, the physical block address corresponding to the logic block address in the page table is the physical block address corresponding to the address mapping information of the superblock whose serial number is assigned in the back part.

6. The storage device metadata management method as claimed in claim 1, wherein when the same logic block address exists in the address mapping information of different superblocks, the physical block address corresponding to the logic block address in the page table is the physical block address corresponding to the address mapping information of the superblock which is written later.

7. The storage device metadata management method as claimed in claim 1, wherein when a system is recovered, for the superblock which is not completely written, a complete scan is made on the superblock which is not completely written for reading a mapping relationship of a logic address and a physical address, and recovering the page table which is not completely written.

8. A storage device metadata management system, wherein the storage device metadata management system comprises: a processor circuitry configured to:

form a superblock from at least one erase block; wherein the superblock reserves a space for storing metadata related to the superblock; the metadata related to the superblock comprises a serial number distributed to the superblock and address mapping information in the superblock;

the address mapping information stores a mapping relationship of a physical block address to a logic block address; when data is written into the superblock, the address mapping information corresponding to the data is also written into the superblock; and recover a page table of a storage system according to the address mapping information of the superblock when the system is recovered; the page table marks a mapping relationship of a logic block address to a physical block address, wherein static data in the metadata is written into a starting erase block by the storage device at a time of formatting, and bad block information in the metadata is written into a remaining space of the starting erase block when a bad block appears;

wherein the static data comprises a basic format of the storage device and the basic format comprises a use of flash memory types, number, and organizational structure.

9. The storage device metadata management system as claimed in claim 8, wherein when the system is recovered, reversing the address mapping information in each superblock for recovering the mapping relationship of a logic sector to a physical sector of the storage system.

10. A storage device, wherein the storage device comprises the storage device metadata management system as claimed in claim 9.

11. The storage device as claimed in claim 10, wherein the storage device is a flash-based solid-state disk.

12. The storage device metadata management system as claimed in claim 8, wherein a space for storing the metadata related to the superblock is adjacent to a data storage space of the superblock.

13. A storage device, wherein the storage device comprises the storage device metadata management system as claimed in claim 12.

14. The storage device as claimed in claim 13, wherein the storage device is a flash-based solid-state disk.

15. The storage device metadata management system as claimed in claim 8, wherein the metadata related to the superblock further comprises erase times of the superblock and/or at least one statistical data of the superblock.

16. A storage device, wherein the storage device comprises the storage device metadata management system as claimed in claim 15.

17. The storage device as claimed in claim 16, wherein the storage device is a flash-based solid-state disk.

18. The storage device metadata management system as claimed in claim 8, wherein when the system is recovered, while the same logic block address exists in the address mapping information of different superblocks, the physical block address corresponding to the logic block address in the page table is the physical block address corresponding to the address mapping information of the superblock whose serial number is assigned in the back part.

19. A storage device, wherein the storage device comprises the storage device metadata management system as claimed in claim 18.

20. The storage device as claimed in claim 19, wherein the storage device is a flash-based solid-state disk.

21. The storage device metadata management system as claimed in claim 8, wherein when the system is recovered, while the same logic block address exists in the address mapping information of the same superblock, the physical block address corresponding to the logic block address in the page table is the physical block address corresponding to the address mapping information of the superblock which is written later.

22. A storage device, wherein the storage device comprises the storage device metadata management system as claimed in claim 21.

23. The storage device as claimed in claim 22, wherein the storage device is a flash-based solid-state disk.

24. The storage device metadata management system as claimed in claim 8, wherein the processor circuitry is further configured to process a complete scan of the superblock which is not completely written for reading a mapping relationship of a logic address and a physical address and recovers the page table which is not completely written for the superblock which is not completely written.

25. A storage device, wherein the storage device comprises the storage device metadata management system as claimed in claim 24.

26. The storage device as claimed in claim 25, wherein the storage device is a flash-based solid-state disk.

27. A storage device, wherein the storage device comprises the storage device metadata management system as claimed in claim 8.

28. The storage device as claimed in claim 27, wherein the storage device is a flash-based solid-state disk.

* * * * *